United States Patent
Kanenaga et al.

(10) Patent No.: US 6,310,845 B1
(45) Date of Patent: Oct. 30, 2001

(54) OPTICAL DISK DEVICE

(75) Inventors: Junichi Kanenaga, Tanashi; Hiroyuki Onda, Higashikurume, both of (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/274,921

(22) Filed: Mar. 23, 1999

(30) Foreign Application Priority Data

Mar. 24, 1998 (JP) .................................. 10-075946

(51) Int. Cl.$^7$ ...................................................... G11B 7/00
(52) U.S. Cl. .................. 369/53.1; 369/53.15; 369/53.42
(58) Field of Search ................................ 369/47.1, 47.14, 369/47.28, 47.36, 47.39, 47.44, 47.45, 53.1, 53.12, 53.15, 53.2, 53.42, 64.27, 44.28, 44.29, 44.34, 44.35, 44.32

(56) References Cited

U.S. PATENT DOCUMENTS 4,855,977 * 8/1989 Getreuer et al. ....................... 369/32
5,398,221 * 3/1995 Ogawa ........................... 369/44.28 X

FOREIGN PATENT DOCUMENTS 5-347068  12/1993 (JP) .
8-227561   9/1996 (JP) .

* cited by examiner

Primary Examiner—Muhammad Edun
(74) Attorney, Agent, or Firm—Anderson, Kill & Olick, P.C.

(57) ABSTRACT

An optical disk device has a unit for counting data read errors from an optical disk and a unit for reducing a playback speed of an optical disk. When a number of data read errors occurring in a predetermined period of time exceeds a predetermined value the playback speed reducing unit reduces the playback speed of the optical disk. As a result, repetition of error detection and consequent reduction in playback speed with each data read command when reading defective sectors of an optical disk can be prevented and the time required for error detection and speed reduction thereby eliminated, greatly improving overall average playback speed.

6 Claims, 7 Drawing Sheets

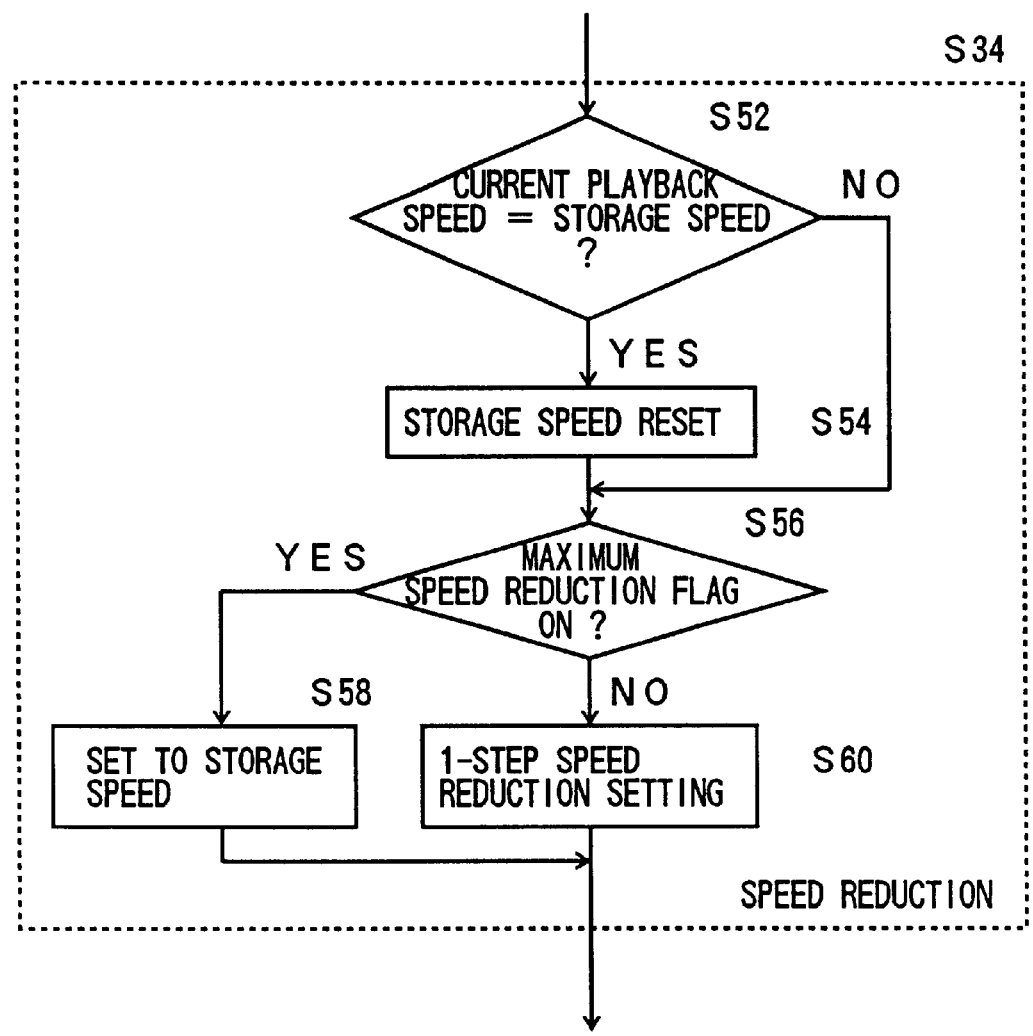

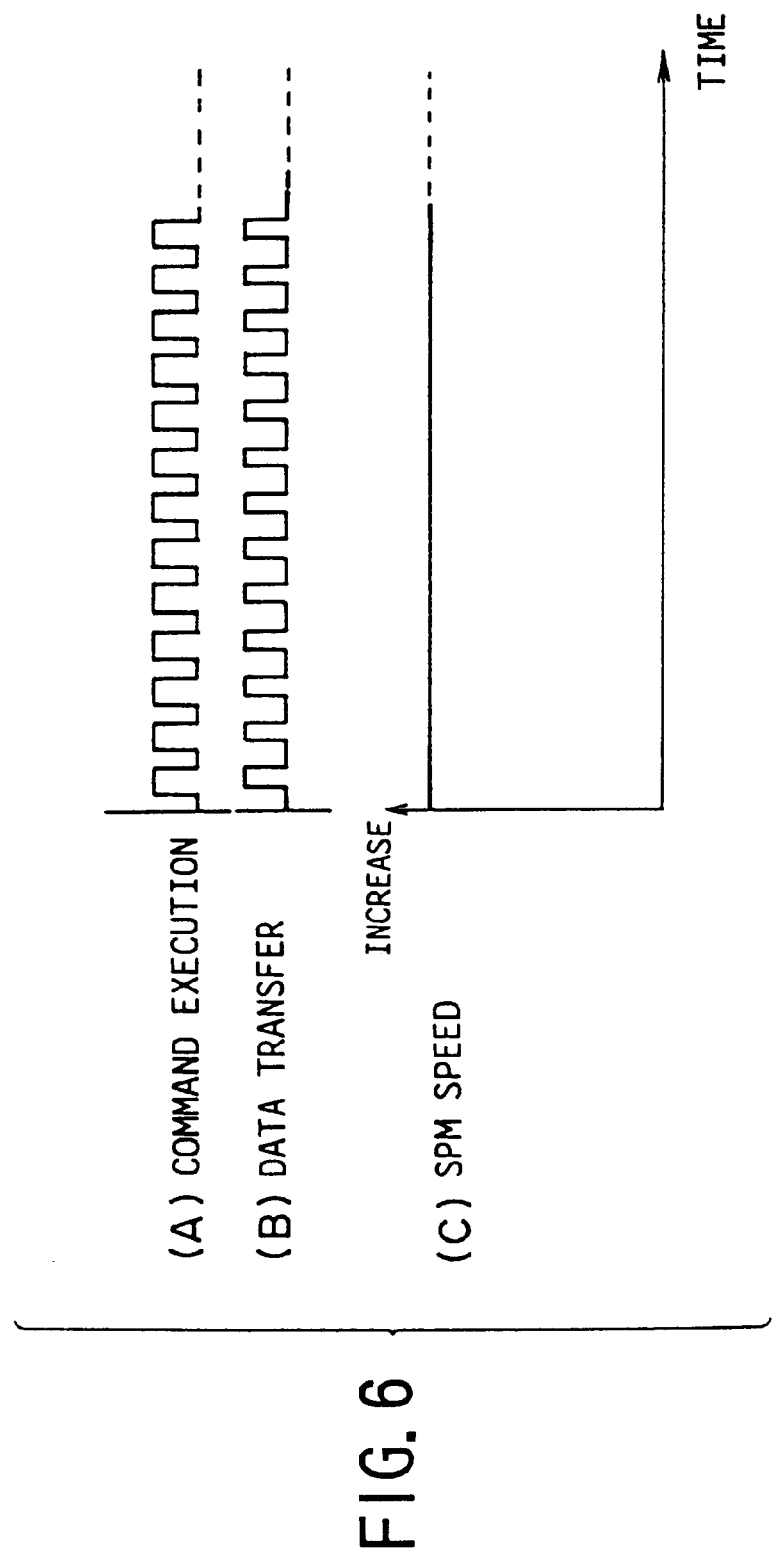

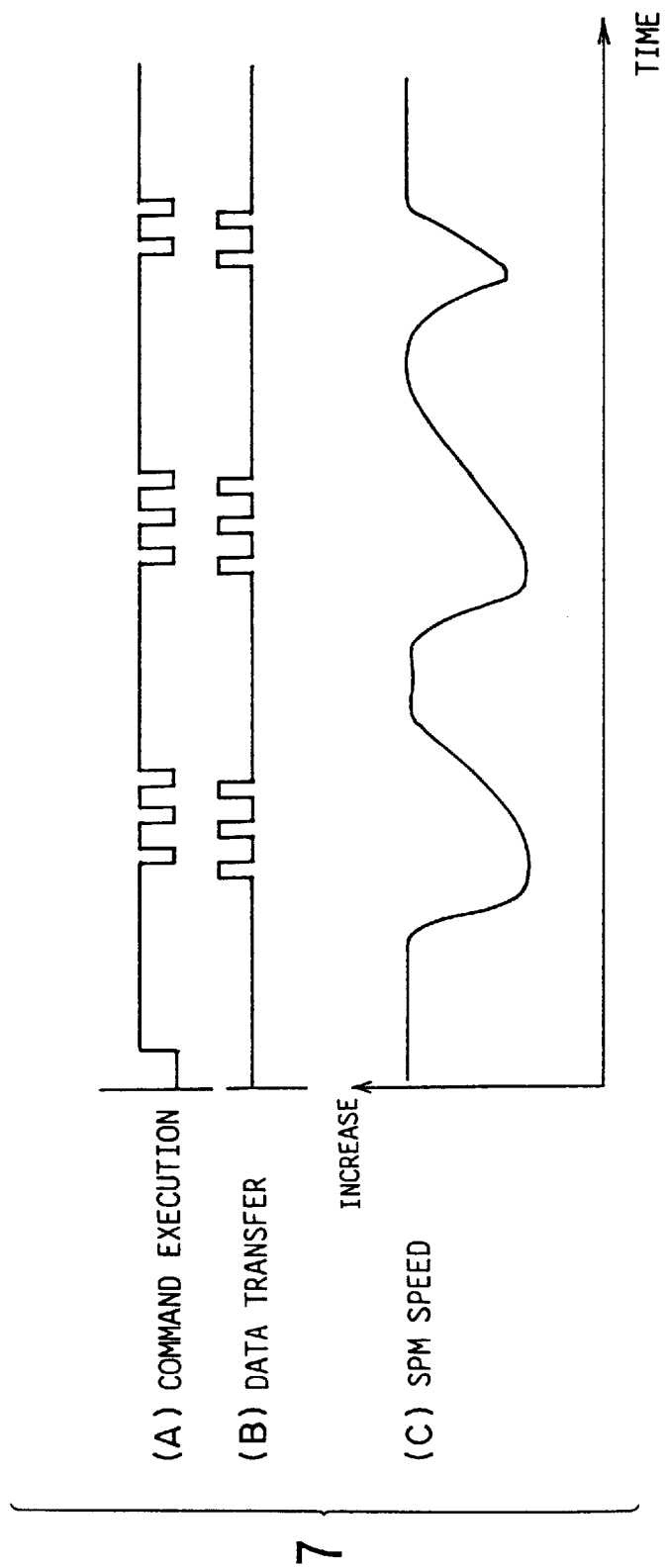

OPTICAL DISK DEVICE

BACKGROUND OF THE INVENTION

1. Field of the Invention

The present invention relates generally to an optical disk device, and more particularly, to an optical disk device that reads and plays back data recorded on an optical disk.

2. Description of the Related Art

In order to increase the speed with which data is played back in optical disk devices for CD-ROM and other optical disks, the speed with which the optical disk rotates has been increased. In some cases, the rotation speed of the optical disk is increased some 20 times a standard rotation speed. At such high rotation speeds, however, vibration of the optical disk caused by eccentricity and unbalancing of the optical disk also increases by the square of the speed of angular rotation. This vibration causes the focus servo and the tracking servo to become misaligned and impedes reading of the data.

In a conventional optical disk device, when a data read command is received from an upstream device such as a personal computer the optical disk device reads data from an optical disk at a maximum playback speed. However, if an error is experienced in the reading of the data from the optical disk, then the data playback speed is decreased in order to re-read the data from the disk. After the data is successfully re-read from the optical disk the data read speed is then returned to the maximum playback speed.

The above-mentioned errors may be of several types, among them (1) a CIRC (cross interleaved Reed-Solomon code) error in the data block on the optical disk that the optical disk device is trying to read, the error being uncorrectable; (2) the synchronization of the data block that the optical disk device is trying to read cannot be acquired; and (3) the optical disk device seeks the sector containing the block that the optical disk device is trying to read, but the seek is unsuccessful.

It should be noted that repeated issuance of data read commands from the upstream device personal computer indicates an occurrence of one or more of the above-described types of errors. Accordingly, there is a consequent substantial lengthening of the overall data read time because time is required to detect an error, to decrease the data playback speed and to return the data playback speed to its previous level.

FIG. 6 and FIG. 7 illustrate the above-described condition. In FIG. 6, wherein each command is represented by a pulse and is continuously repeated and executed as shown in (A), the read data is transferred at the rate of one transfer per pulse as shown in (B) and the rotation speed of the spindle motor SPM that rotatably drives the optical disk is approximately uniform as shown in (C).

By contrast, when a data read command is repeatedly issued with respect to a defective sector of the optical disk as shown in FIG. 7, the defective sector data read command execution time lengthens substantially as indicated by the large pulse width as shown in (A), the read data is transferred at the rate of one transfer per pulse as shown in (B) and the rotation speed of the spindle motor SPM that rotatably drives the optical disk fluctuates widely as shown in (C). The wide fluctuation in the speed of the spindle motor SPM reflects a decrease in the data playback speed at defective sectors of the optical disk followed by an increase in the data playback speed after the data is eventually and successfully read from the optical disk. As a result, as described above there is a consequent substantial lengthening of the overall data read time because time is required to detect an error, to decrease the data playback speed and to return the data playback speed to its previous level.

In general, when attempting to execute an optical disk program, a personal computer reads data from the optical disk in units of several tens to several hundreds of blocks at a time at a minimum. However, the data read command is divided among units of several blocks and issued continuously to the optical disk device. Accordingly, with sectors for which re-reading is occurring continuously, the data playback speed is decreased by the data read command and, despite having only just completed reading the data, the next data read command immediately increases the data playback speed in order to read additional data.

If, for example, a sector of an optical disk exists which cannot be read at 20× data playback speed, then the data playback speed is decreased and the time taken to complete reading the data from the sector may be several seconds. Accordingly, when a personal computer attempts to read several tens to several hundreds of blocks of data at a time, the time required to read the data when there is an error is several tens of times longer compared to the time required to read the data when there is no error and, as a result, the performance of the optical disk device can appear to have deteriorated by a factor of several tens.

SUMMARY OF THE INVENTION

Accordingly, it is an object of the present invention to provide an optical disk device in which the problems described above are eliminated.

Another and more specific object of the present invention is to provide an optical disk device that can eliminate the time needed to detect errors and reduce playback speed by preventing repetition of error detection and data playback speed reduction with each data read command when playing back defective sectors of an optical disk.

The above-described objects of the present invention are achieved by an optical disk device for reading and playing back data from an optical disk by using a light pickup, the optical disk device comprising:

means for counting a number of data read errors; and means for reducing a playback speed of the optical disk when a number of errors counted by the counting means exceeds a predetermined value.

According to the present invention, by reducing the playback speed of the optical disk when the number of errors in a predetermined time period exceeds a predetermined value, it is possible to prevent repetition of error detection and data playback speed reduction with each data read command when playing back defective sectors of an optical disk, eliminating the time needed to detect errors and reduce playback speed and greatly improving the overall average playback speed.

Further, the above-described objects of the present invention are also achieved by an optical disk device for reading and playing back data from an optical disk by using a light pickup, the optical disk device comprising:

means for determining a time interval between data read errors; and means for reducing a playback speed of the optical disk when the time interval between read errors is within a predetermined time period.

According to the present invention, by reducing the playback speed of the optical disk when the time interval between read errors is within a predetermined time period, it is possible to prevent repetition of error detection and data playback speed reduction with each data read command when playing back defective sectors of an optical disk, eliminating the time needed to detect errors and reduce playback speed and greatly improving the overall average playback speed.

Additionally, the above-described objects of the present invention are also achieved by either of the optical disk devices as described above, wherein the means for reducing playback speed reduces a playback speed of an optical disk to a minimum playback speed of the optical disk device.

According to the present invention, by reducing the optical disk playback speed to an optical disk device minimum playback speed, it is possible to prevent repetition of error detection and data playback speed reduction with each data read command when reading defective sectors.

Further, the above-described objects of the present invention are also achieved by either of the optical disk devices as described above, wherein the means for reducing playback speed reduces playback speed to a minimum playback speed among a plurality of playback speeds to which a playback speed of an optical disk has been reduced upon a data read error.

According to the present invention, by reducing playback speed to a minimum playback speed among a plurality of playback speeds to which a playback speed of an optical disk has been reduced upon a data read error, it is possible at times to increase the playback speed above a minimum playback speed of the optical disk device, thus further improving the overall average playback speed.

Other objects, features and advantages of the present invention will become more apparent from the following detailed description when read in conjunction with the accompanying drawings.

BRIEF DESCRIPTION OF THE DRAWINGS

FIG. 5 shows a flow chart of processes executed in a variation of the speed reduction routine of a step S34;

FIG. 6 is a diagram showing conventional data read command execution timing, read data transfer timing and spindle motor rotation speed; and FIG. 7 is a diagram showing conventional data read command execution timing, read data transfer timing and spindle motor rotation speed.

DESCRIPTION OF THE PREFERRED EMBODIMENTS

A detailed description will now be given of a first embodiment of an optical disk device according to the present invention, with reference to FIG. 1 through FIG. 3.

Figure 1:
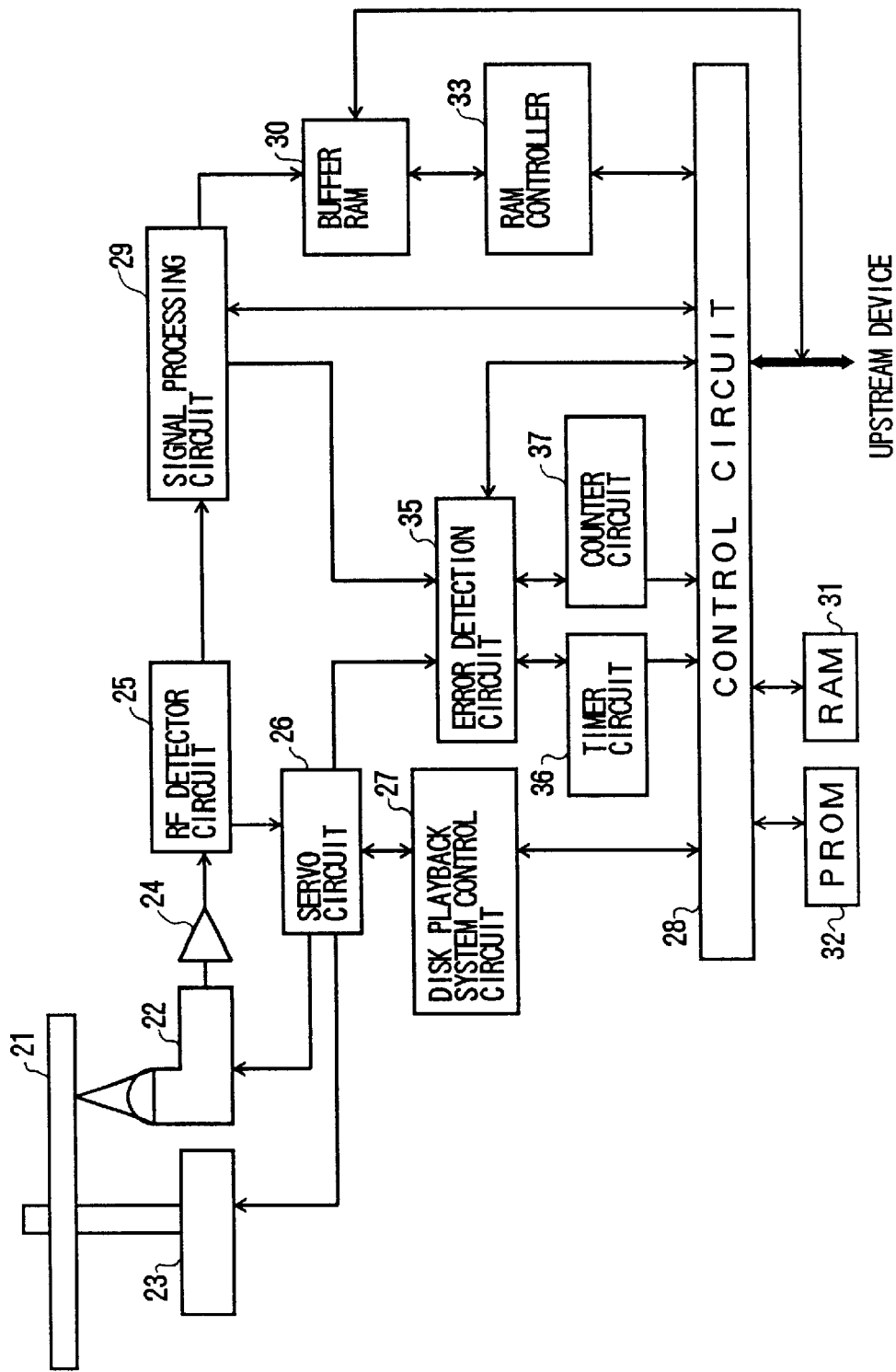
FIG. 1 shows a block diagram of a first embodiment of an optical disk device according to the present invention.

FIG. 1 is a block diagram of an embodiment of an optical disk device according to the present invention. As shown in FIG. 1, an optical disk 21 is rotatably driven by a spindle motor 23. Based on a read command supplied from an upstream device personal computer, a control circuit 28 supplies a command to a disk system control circuit 27. The disk system control circuit 27 controls the rotation speed of the spindle motor 23 via a servo circuit 26. Additionally, the disk system control circuit 27 controls the rotation of a thread motor of an optical pickup 22, seeks a desired block from the optical disk 21 and reads the data from the block.

The laser beam emitted by the optical pickup 22 is reflected off a recording surface of the optical disk 21 and detected by the optical pickup 22, with the playback signal obtained at the optical pickup 22 being supplied to an RF detection circuit 25 via an amplifier 24. The playback signal, which is formed into a waveform by the RF detection circuit 25, is supplied to the servo circuit 26 and to a signal processing unit 29. The servo circuit 26, using the playback signal supplied from the RF detection circuit, activates the optical pickup 22 focus servo, tracking servo and optical pickup thread motor servo. Additionally, the servo circuit 26 activates the spindle motor 23 constant linear velocity (CLV) servo.

The playback signal supplied from the RF detection circuit to the signal processing circuit is written to the buffer memory buffer RAM 30 in block units as playback data after being EFM demodulated and after the block synchronizing signal and address data have been separated and synchronized and CIRC error correction undertaken. Additionally, the playback data read from the buffer RAM 30 is transferred to an upstream device personal computer.

The writing and reading of data to and from the buffer RAM 30 is performed by a RAM controller 33 that is itself controlled by the control circuit 28. Additionally, the address data is read into the RAM 31 from the control circuit 28 and is used to seek a desired data block. Rotation speed data for each address of the optical disk 21 for the spindle motor 23 CLV control and the control program that the control circuit 28 executes are stored in the program ROM 32.

An error signal is generated and supplied to an error detection circuit 35 when the servo circuit 26 repeatedly seeks the sector of the optical disk 21 containing the desired block but fails to find it. Additionally, the signal processing circuit 29 generates an error signal and supplies that error signal to an error detection circuit when a CIRC error occurs in the block on the optical disk 21 that the optical disk device is attempting to read or when the synchronization of the block of the optical disk 21 that the optical disk device is attempting to read cannot be obtained.

A timer circuit 36, which is reset whenever an error signal is detected by the error detection circuit 35, times a subsequent predetermined time period and signals the control circuit 28. A counter circuit 37 counts the number of times an error signal is detected by the detection circuit 35 during a predetermined time period measured by the timer circuit 36, that is, counts the number of errors, and transmits that count value to the control circuit 28.

Figure 2:
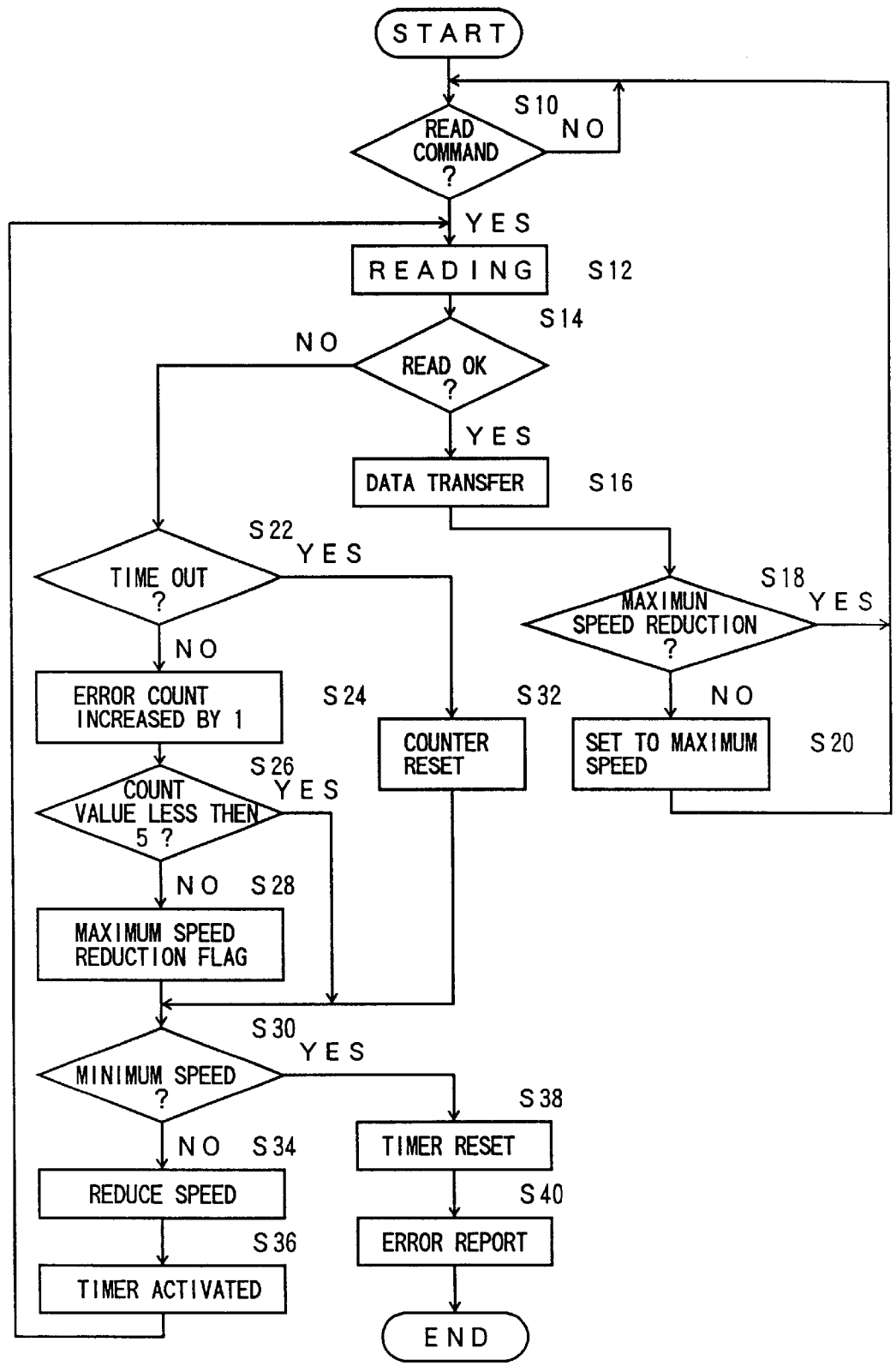
FIG. 2 shows a flow chart of processes executed in a first embodiment of the data playback speed control processes executed by a control circuit 28 shown in FIG. 1.

FIG. 2 is a flow chart of processes executed in a first embodiment of the data playback speed control processes executed by the control circuit 28 shown in FIG. 1. In a step S10, the control circuit 28 determines whether or not a read command has been supplied from the upstream device personal computer. If a read command has been supplied, then the control circuit 28 proceeds to a step S12 and reads the block specified by the read command from the optical disk 21. Assume an initial playback speed at read as 20×.

At a step S14, it is determined whether or not the block has been read without error. If the block has been read without error, then in a step S16 the data of the read block is transferred to the upstream device personal computer from the buffer RAM 30. Thereafter, in a step S18 it is determined whether or not a maximum speed reduction flag is ON and the maximum speed has been restricted. If the maximum speed reduction flag is ON and the maximum speed has been restricted, then the process proceeds directly to a step S10. If the maximum speed reduction flag is OFF and the maximum speed has not been restricted, then the playback speed is set to a maximum speed 20× in a step S20.

If, however, in step S14 it is determined that the optical disk device is unable to read the block without error, then the process proceeds to a step S22 and it is determined whether or not a time period measured by the timer circuit 36 exceeds a predetermined time period and a time out is in effect. If there is no time out, then in a step S24 the error count of the counter circuit 37 is increased by just 1 and in a step S26 it is determined whether or not the error count is 5 or greater. If in step S26 the error count is 5 or greater, then in a step S28 the maximum speed reduction flag goes ON and the process proceeds to a step S30. If in step S26 the error count is less than 5, then the process proceeds directly to step S30. Additionally, if in step S22 a time out is in effect, then the process proceeds to step S30 after resetting the counter in a step S32.

In step S30, it is determined whether or not the playback speed is a minimum speed, for example, 4×. If the playback speed is not a minimum speed, then in a step S34 the playback speed is decreased. In this step S34 the playback speed is normally reduced from a maximum speed 20× to an intermediate speed 10×, and from an intermediate speed to a minimum speed 4×. However, when the maximum speed reduction flag is ON the playback speed is set to a minimum speed 4×.

In a step S36, the timer circuit 36 is activated and the process proceeds to step S12. That is, if there is a read error, then the playback speed is reduced to a minimum speed in order to re-read the data. If in step S30 the playback speed is at a minimum speed, then the process proceeds to a step S38 and, after the timer circuit 36 is reset in step S38, an error is reported to the upstream device personal computer in a step S40. This reporting of an error indicates that the data cannot be read even at a minimum playback speed. This process cycle then terminates.

Figure 3:
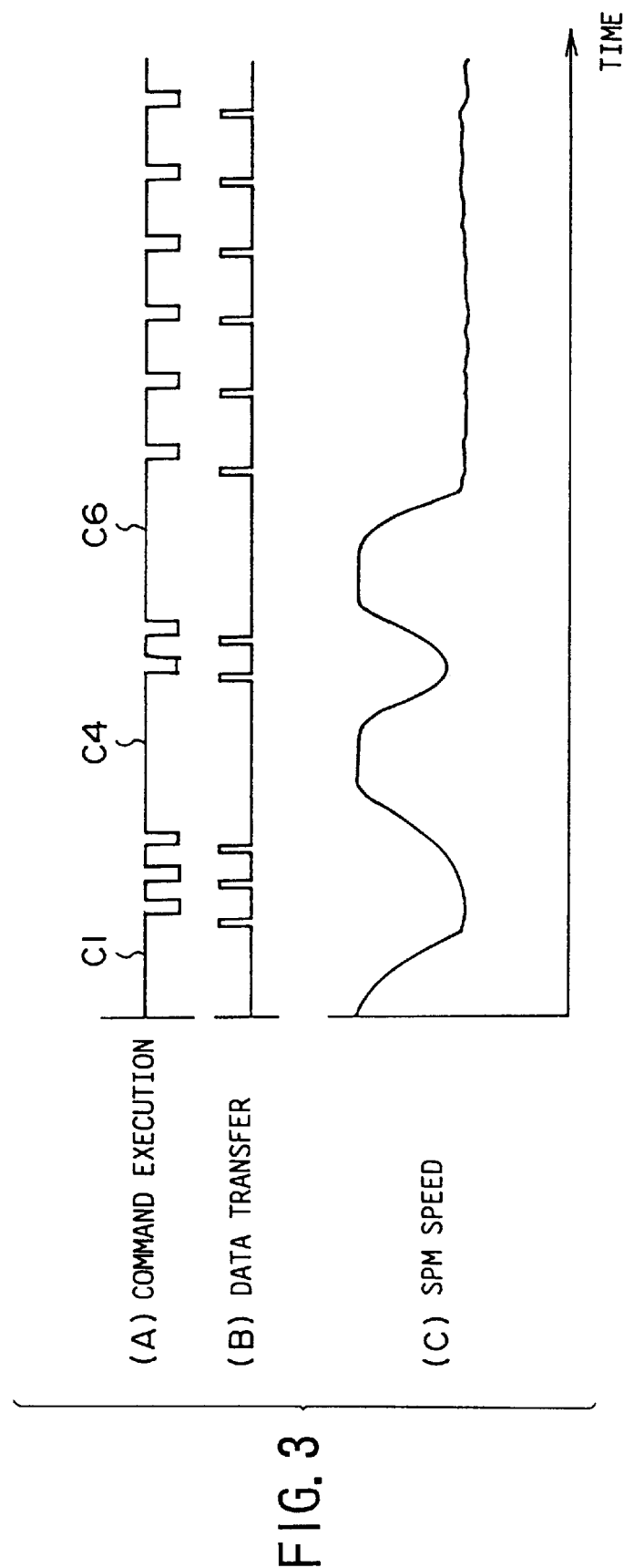
FIG. 3 shows a chart of (A) the data read command execution timing (high level), (B) the read data transfer timing and (C) the spindle motor rotation speed, respectively, of the present embodiment.

FIG. 3 is a chart showing (A) the data read command execution timing (high level), (B) the read data transfer timing and (C) the spindle motor rotation speed, respectively, of the present embodiment. An error occurs with respect to a C1 portion of the data read command (A) at a speed of 20× and at a speed of 10×, and is read at a speed of 4×. Similarly, within a predetermined period of time another error occurs with respect to a C4 portion of the data read command (A) at a speed of 20× and at a speed of 10×, and is read at a speed of 4×. Yet again, another error occurs with respect to a C6 portion of the data read command (A) within a predetermined period of time at a speed of 20× and the count becomes 5, turning the maximum speed reduction flag ON, setting the playback speed thereafter to a spindle motor rotation speed (C) of 4× and executing the data read command.

As can be readily appreciated from the above description, repetition of error detection and playback speed reduction with each data read command can be prevented when playing back defective sectors of an optical disk where a continuous stream of data read commands are issued from an upstream device such as a personal computer. As a result, the time ordinarily required to execute repeated data read commands can be eliminated, thus greatly improving the overall average playback speed.

A detailed description will now be given of a second embodiment of an optical disk device according to the present invention, with reference to FIG. 4.

Figure 4:
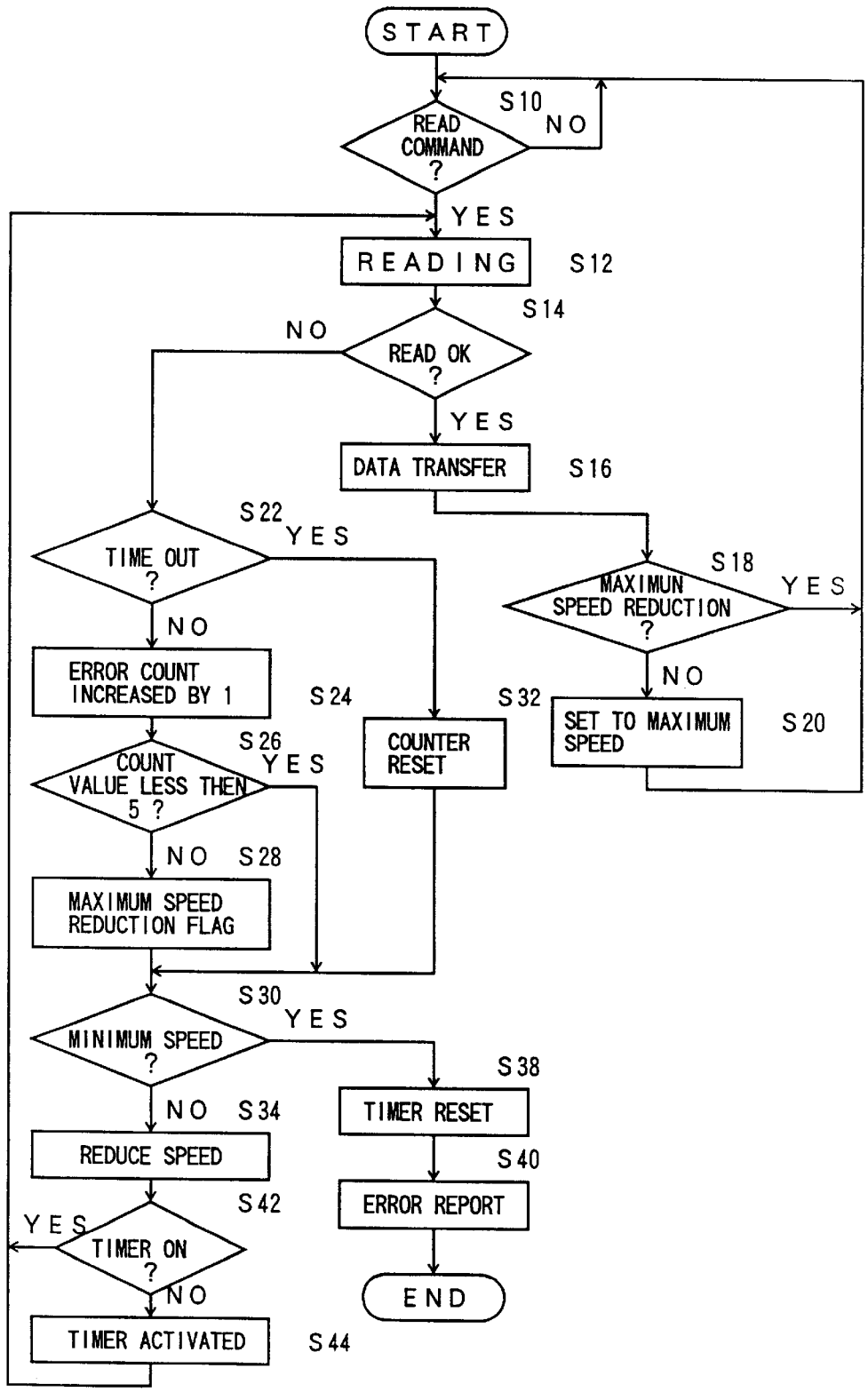
FIG. 4 shows a flow chart of processes executed in a second embodiment of the data playback speed control processes executed by the control circuit 28 shown in FIG. 1.

FIG. 4 is a flow chart of processes executed in a second embodiment of the data playback speed control processes executed by the control circuit 28 shown in FIG. 1. Steps identical to those shown in FIG. 2 have been labeled identically.

In step S10 the control circuit 28 determines whether or not a read command has been supplied from the upstream device personal computer and proceeds to step S12 when a read command has been supplied, whereupon the control circuit 28 proceeds to read the block specified in the read command from the optical disk 21. Initial read playback speed is at a maximum, that is, 20×.

Next, in step S14 it is determined whether or not the appropriate block has been read without error. If the block has been read without error, then in step S16 the data of the read block is transferred to the upstream device personal computer from the buffer RAM 30. Thereafter, in step S18 it is determined whether or not the maximum speed reduction flag is ON and the maximum speed has been restricted. If the maximum speed reduction flag is ON and the maximum speed has been reduced, then the process proceeds directly to step S10. If the maximum speed reduction flag is OFF and the maximum speed has not been reduced, then in step S20 the playback speed is set to a maximum speed 20×.

If, however, in step S14 it is determined that the optical disk device is unable to read the appropriate block without error, then the process proceeds to step S22. In step S22 it is determined whether or not a time period measured by the timer circuit 36 exceeds a predetermined time period and a time out is in effect. If there is no time out, then in step S24 the error count of the counter circuit 37 is increased by just 1 and in step S26 it is determined whether or not the error count is 5 or greater. If in step S26 the error count is 5 or greater, then in step S28 the maximum speed reduction flag goes ON and the process proceeds to step S30. If in step S26 the error count is less than 5, then the process proceeds directly to step S30. Additionally, if in step S22 a time out is in effect, then the process proceeds to step S30 after resetting the counter in step S32.

In step S30, it is determined whether or not the playback speed is a minimum speed 4×. If the playback speed is not a minimum speed, then in a step S34 the playback speed is decreased. In this step S34 the playback speed is normally reduced from a maximum speed 20× to an intermediate speed 10×, and from an intermediate speed 10× to a minimum speed 4×. However, when the maximum speed reduction flag is ON the playback speed is set to a minimum speed 4×.

Next, in a step S42, it is determined whether or not the timer circuit 36 has been activated and, if the timer circuit 36 has already been activated, the process proceeds to step S12. If the timer circuit 36 has not been activated, then in a step S44 the timer circuit 36 is reset and activated, and the process proceeds to step S12. That is, if there is a read error, then the playback speed is reduced to a minimum speed in order to re-read the data. If in step S30 the playback speed is at a minimum speed, then the process proceeds to step S38 and, after the timer circuit 36 is reset in step S38, an error is reported to the upstream device personal computer in step S40. This reporting of an error indicates that the data cannot be read even at a minimum playback speed. This process cycle then terminates.

Whereas in the first embodiment of the present invention it is determined whether or not a time interval between read errors is within a predetermined time period as measured by the timer circuit 36, in the second embodiment of the present invention it is determined whether or not 5 or more read errors occur within a predetermined time period as measured by the timer circuit 36. Even in this first embodiment, however, repetition of error detection and playback speed reduction with each data read command can be prevented when playing back defective sectors of an optical disk where a continuous stream of data read commands are issued from an upstream device such as a personal computer. As a result, the time ordinarily required to execute repeated data read commands can be eliminated, thus greatly improving the overall average playback speed.

FIG. 5 shows a flow chart of processes executed in a variation of the speed reduction routine of step S34. In a step S52, the control circuit 28 determines whether or not a current playback speed is a data storage speed. In this initial state, the data storage speed is a maximum speed 20×. If the current playback speed is the storage speed, then the process proceeds to a step S54, the data storage speed is reduced by one step to a lower speed and the process proceeds to a step S56. In step S54, the data storage speed is reduced a single step, in steps of, for example, 20×, 10× and 4×. If the current playback speed is not the data recording speed, then the process proceeds to a step S56.

In step S56 it is determined whether or not the maximum speed reduction flag is ON. If the maximum speed reduction flag is ON, then in a step S58 the playback speed is set to the data storage speed. However, if the maximum speed reduction flag is OFF, then in a step S60 the playback speed is reduced one step to a lower speed.

In both the first embodiment and the second embodiment of the present invention, the playback speed is reset to 4× when the maximum speed reduction flag is ON. However, in the variation described above, when the maximum speed reduction flag is ON the playback speed is set to the lowest playback speed of a plurality of playback speeds to which the playback speed has been reduced in response to a data read error. In some cases, this playback speed may be set at a playback speed higher than the lowest playback speed of the optical disk device, thus improving the overall average playback speed.

Additionally, the number of errors in a given period of time that will trigger a reduction in playback speed, that is, the error count, need not be limited to the number specified in the embodiments described above.

Further, it should be noted that the counter circuit 37 corresponds to the counting means described above, and steps S18, S26 and S28 collectively correspond to the playback speed reducing means described above.

The above description is provided in order to enable any person skilled in the art to make and use the invention and sets forth the best mode contemplated by the inventors of carrying out their invention. The present invention is not limited to the specifically disclosed embodiments and variations, and modifications may be made without departing from the scope of the present invention.

The present application is based on Japanese priority application No. 10-75946 filed on Mar. 24, 1998, the entire contents of which are hereby incorporated by reference.

What is claimed is:

1. An optical disk device for reading and playing back data from an optical disk by using a light pickup, a playback being performed at a maximum playback speed and then the playback speed being gradually reduced based on data read errors until a playback is performed without errors, the playback speed then being returned after reading the data, the optical disk device comprising:

means for counting a number of data read errors; and means for resetting the maximum playback speed of the optical disk to a limited maximum playback speed correlated to that at which a data read error does not occur when a number of errors counted by the counting means during a predetermined time period exceeds a predetermined value.

2. The optical disk device as claimed in claim 1, wherein the means for resetting playback speed reduces a playback speed of an optical disk to a minimum playback speed at which a data read error does not occur of the optical disk device.

3. The optical disk device as claimed in claim 1, wherein the means for resetting playback speed reduces playback speed to a playback speed from among a plurality of playback speeds correlated to which a playback speed of an optical disk has been reduced at which a data read error does not occur.

4. An optical disk device for reading and playing back data from an optical disk by using a light pickup, a playback being performed at a maximum playback speed and then the playback speed being gradually reduced based on data read errors until a playback is performed without errors, the playback speed then being returned after reading the data, the optical disk device comprising:

means for determining a time interval between data read errors; and means for reducing a playback speed of the optical disk when the time interval between read errors is within a predetermined time period such that the playback speed is reduced to a new maximum playback speed correlated to that at which a data read error does not occur.

5. The optical disk device as claimed in claim 4, wherein the means for reducing playback speed reduces a playback speed of an optical disk to a minimum playback speed of the optical disk device.

6. The optical disk device as claimed in claim 4, wherein the means for resetting playback speed reduces playback speed to a playback speed among a plurality of playback speeds correlated to which a playback speed of an optical disk has been reduced at which a data read error does not occur.

* * * * *